(No Model.)
J. C. McKENZIE.
DEVICE FOR ATTACHING AND DETACHING WOOD LABELS TO MAIL BAGS.
No. 344,488. Patented June 29, 1886.
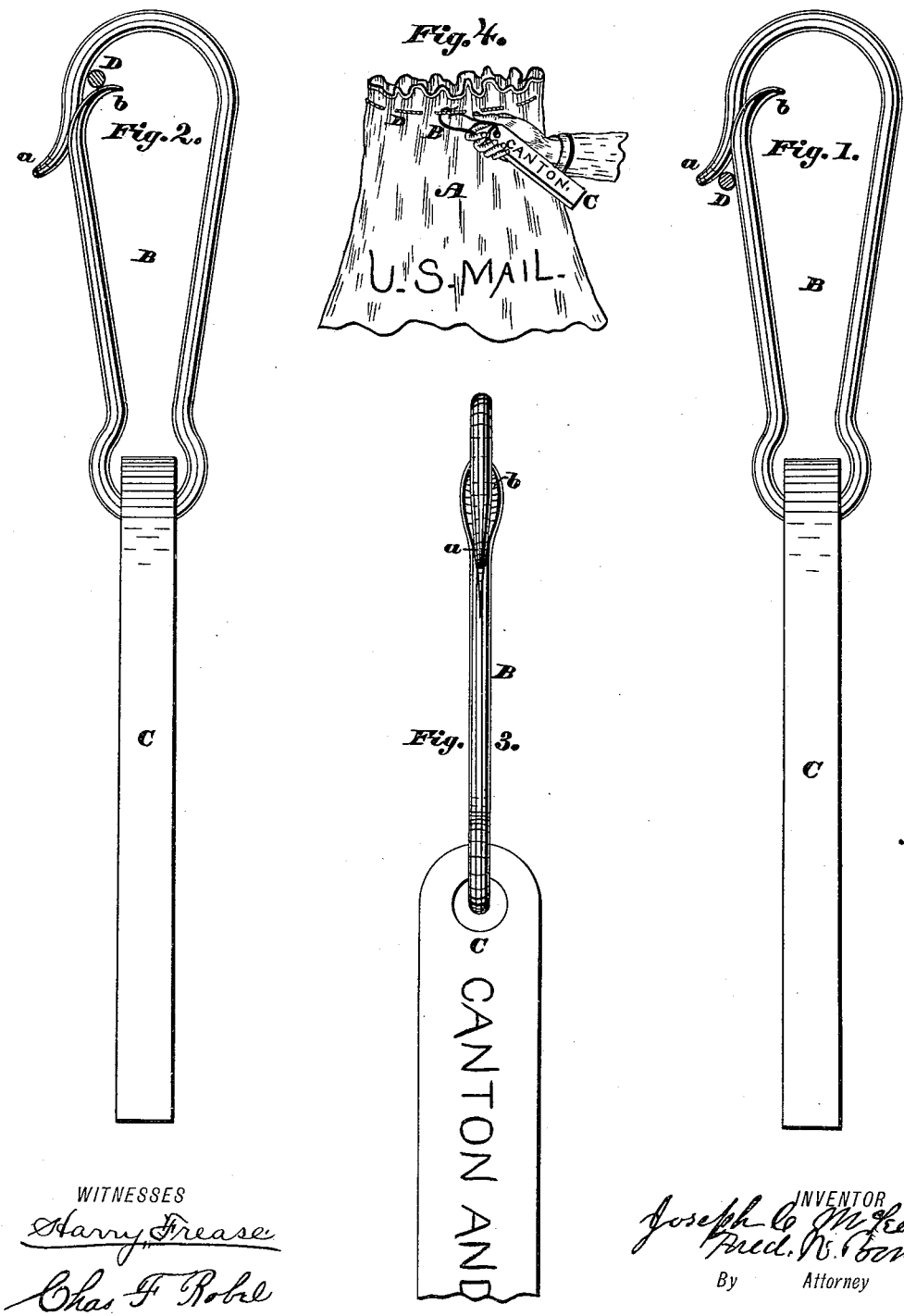
WITNESSES
Harry Frease
Chas. F. Robr
INVENTOR
Joseph C. McKenzie
Fred. W. Bond
By Attorney

UNITED STATES PATENT OFFICE.

JOSEPH C. McKENZIE, OF CANTON, OHIO, ASSIGNOR OF ONE-HALF TO CHARLES C. THOMPSON, OF SAME PLACE.

DEVICE FOR ATTACHING AND DETACHING WOOD LABELS TO MAIL-BAGS.

SPECIFICATION forming part of Letters Patent No. 344,488, dated June 29, 1886.

Application filed October 23, 1885. Serial No. 180,685. (No model.)

*To all whom it may concern:*

Be it known that I, JOSEPH C. McKENZIE, a citizen of the United States, residing at Canton, in the county of Stark and State of Ohio, have invented certain new and useful Improvements in Devices for Attaching and Detaching Wooden Labels to Mail-Sacks; and I do hereby declare that the following is a full, clear, and exact description of the same, reference being had to the annexed drawings, making a part of this specification, and to the letters and figures of reference marked thereon, in which—

Figure 1 is a side view showing my invention in proper position to be attached. Fig. 2 is a side elevation showing my invention in proper position to be detached. Fig. 3 is a front view showing a side view of a label. Fig. 4 is a side view of a portion of a mail-sack, showing my improved device being attached thereto.

The present invention has relation to devices for attaching and detaching labels to and from mail-bags; and its nature consists in providing a link-like structure having two free ends, one of which is grooved to receive the other, such ends being adapted to spring apart to receive or release the tag or label and to automatically close.

Similar letters of reference indicate corresponding parts in all the figures of the drawings.

In the accompanying drawings, A represents a mail-sack, which is of the ordinary kind, and is closed in the ordinary manner.

B represents the hook proper, and may be formed substantially as shown in the drawings, and, as shown, is formed of a single piece of metal, and is so arranged that its normal position will be as shown in Figs. 1, 2, and 3, and is made of such material that it will assume that position after being attached or detached to or from the mail-sack. The portion $a$ of the hook B is bent or curved outwardly, as shown in the drawings, said bent or curved portion $a$ being a segment of a circle of any desired diameter. The portion $b$ is bent or curved inwardly, as shown in the drawings, and is provided with a grooved lip, which is for the purpose of receiving and holding the bent or curved portion $a$, as shown in Fig. 3.

In use the label C is attached as shown in the drawings, and the mail-sack closed in the ordinary manner by means of the cord D, when the hook B, together with the label C, is attached, as shown in Fig. 4.

It will be seen that by my peculiar arrangement I am enabled to use the ordinary wooden labels, such as are commonly tied to the closing-cord D.

It will also be seen that the mail-sack can be closed by threading the hook B through the eyelets; but I prefer to use the hook as shown in the drawings.

It will be understood that the hook B should be made of spring steel or brass of sufficient size and strength to handle the mail-sack with said hook, if desired.

It will be understood that by the use of my improvement the necessity of using cord in attaching the labels is dispensed with.

Having now fully described my invention, what I claim as new, and desire to secure by Letters Patent, is—

An improved mail-bag-label-attaching device, consisting of the metallic spring link-like structure having overlapping free ends, one end curved outwardly and the other inwardly, and one of such ends provided with a groove, all substantially as set forth.

In testimony that I claim the above I have hereunto subscribed my name in the presence of two witnesses.

JOSEPH C. McKENZIE.

Witnesses:
CHAS. F. ROBEL,
FRED W. BOND.